(12) United States Patent
Villarreal et al.

(10) Patent No.: US 10,563,617 B2
(45) Date of Patent: Feb. 18, 2020

(54) ELECTRICALLY OPERATED PROPELLANT FOR SOLID ROCKET MOTOR THRUST MANAGEMENT

(71) Applicant: Raytheon Company, Waltham, MA (US)

(72) Inventors: James K. Villarreal, Tucson, AZ (US); Mark T. Langhenry, Tucson, AZ (US); Matt H. Summers, Marana, AZ (US)

(73) Assignee: Raytheon Company, Waltham, MA (US)

( * ) Notice: Subject to any disclaimer, the term of this patent is extended or adjusted under 35 U.S.C. 154(b) by 724 days.

(21) Appl. No.: 15/274,669

(22) Filed: Sep. 23, 2016

(65) Prior Publication Data
US 2018/0128207 A1    May 10, 2018

(51) Int. Cl.
*F02K 9/24* (2006.01)
*F02K 9/12* (2006.01)
(Continued)

(52) U.S. Cl.
CPC ............... *F02K 9/24* (2013.01); *B64G 1/403* (2013.01); *F02K 9/08* (2013.01); *F02K 9/12* (2013.01); *F02K 9/26* (2013.01); *F02K 9/28* (2013.01); *F02K 9/82* (2013.01); *F02K 9/86* (2013.01); *F02K 9/94* (2013.01); *F02K 9/95* (2013.01); *F02K 9/34* (2013.01); *F02K 9/97* (2013.01);
(Continued)

(58) Field of Classification Search
CPC ..... F02K 9/08; F02K 9/10; F02K 9/26; F02K 9/36; F02K 9/94; F02K 9/95; F02K 9/12; F02K 9/24; F02K 9/82; F02K 9/28; F02K 9/86; F02K 9/97; B64G 1/403
See application file for complete search history.

(56) References Cited

U.S. PATENT DOCUMENTS 3,031,842 A    5/1962  Ledwith
3,167,912 A    2/1965  Ledwith
(Continued)

FOREIGN PATENT DOCUMENTS

EP            137395 B1    9/2010

OTHER PUBLICATIONS

Zandbergen, Typical Solid Propellant Rocket Motors, Dec. 2013, Delft University of Technology, pp. 8, 15, 17 and 27 (Year : 2013).*
(Continued)

*Primary Examiner* — William H Rodriguez
*Assistant Examiner* — Kyle Robert Thomas
(74) *Attorney, Agent, or Firm* — Eric A. Gifford

(57) ABSTRACT

Electrically operated propellant is used to supplement the thrust provided by solid rocket motor (SRM) propellant to manage thrust produced by a SRM. The gas produced by burning the electrically operated propellant may be injected upstream of the nozzle to add mass and increase chamber pressure Pc, injected at the throat of the nozzle to reduce the effect throat area At to increase chamber pressure Pc or injected downstream of the throat to provide thrust vector control or a combination thereof. Certain types of electrically operated propellants can be turned on and off provided the chamber pressure Pc does not exceed a self-sustaining threshold pressure eliminating the requirement for physical control valves.

23 Claims, 11 Drawing Sheets

(51) Int. Cl.

| | | |
|---|---|---|
| *F02K 9/95* | (2006.01) | |
| *F02K 9/86* | (2006.01) | |
| *F02K 9/82* | (2006.01) | |
| *B64G 1/40* | (2006.01) | |
| *F02K 9/08* | (2006.01) | |
| *F02K 9/94* | (2006.01) | |
| *F02K 9/26* | (2006.01) | |
| *F02K 9/28* | (2006.01) | |
| *F02K 9/34* | (2006.01) | |
| *F02K 9/97* | (2006.01) | |

(52) U.S. Cl.
CPC ...... *F05D 2220/80* (2013.01); *F05D 2240/35* (2013.01)

(56) References Cited

U.S. PATENT DOCUMENTS

| | | | |
|---|---|---|---|
| 3,293,855 A * | 12/1966 | Cuttill | F02K 9/86 60/229 |
| 3,426,972 A | 2/1969 | Osburn | |
| 3,563,467 A | 2/1971 | Marsh et al. | |
| 3,759,039 A * | 9/1973 | Williams | F02K 9/82 239/265.23 |
| 4,840,024 A | 6/1989 | McDonald | |
| 6,982,013 B1 * | 1/2006 | Fallis | C06B 23/009 149/19.1 |
| 7,464,535 B2 | 12/2008 | Anderson et al. | |
| 8,539,751 B2 | 9/2013 | Cover et al. | |
| 8,584,443 B1 | 11/2013 | Carlson | |
| 8,857,338 B2 | 10/2014 | Sawka et al. | |
| 8,950,329 B2 | 2/2015 | Villarreal et al. | |
| 2005/0120703 A1 * | 6/2005 | Rohrbaugh | F02K 9/08 60/229 |
| 2008/0092521 A1 * | 4/2008 | Dulligan | F02K 9/26 60/254 |
| 2010/0064925 A1 * | 3/2010 | Cavalleri | F02K 9/24 102/376 |
| 2011/0259230 A1 * | 10/2011 | Sawka | F02K 9/95 102/374 |
| 2013/0097995 A1 * | 4/2013 | Schroeder | F02K 9/94 60/219 |
| 2014/0174313 A1 | 6/2014 | Villarreal | |

OTHER PUBLICATIONS

Caveny, Leonard, Thrust and Ignition Transients of the Space Shuttle Solid Rocket Motor, Dec. 1980, J. Spacecraft, vol. 17, p. 492 (Year: 1980).*

* cited by examiner

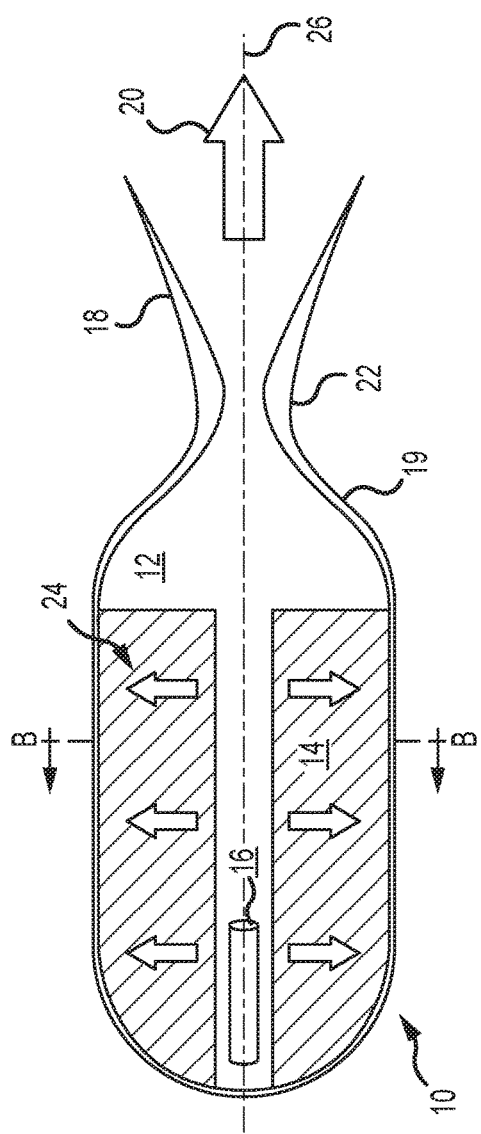
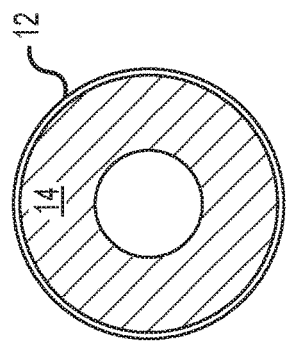
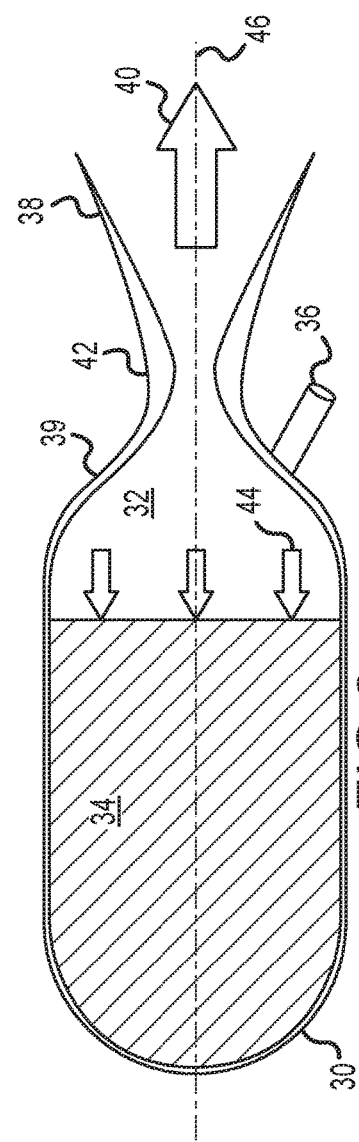

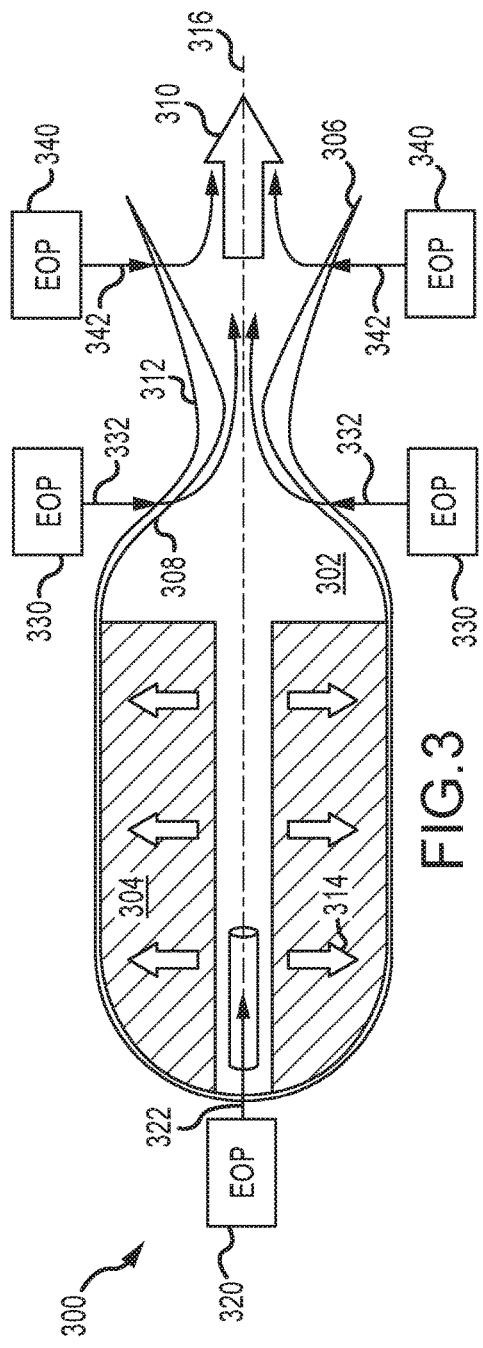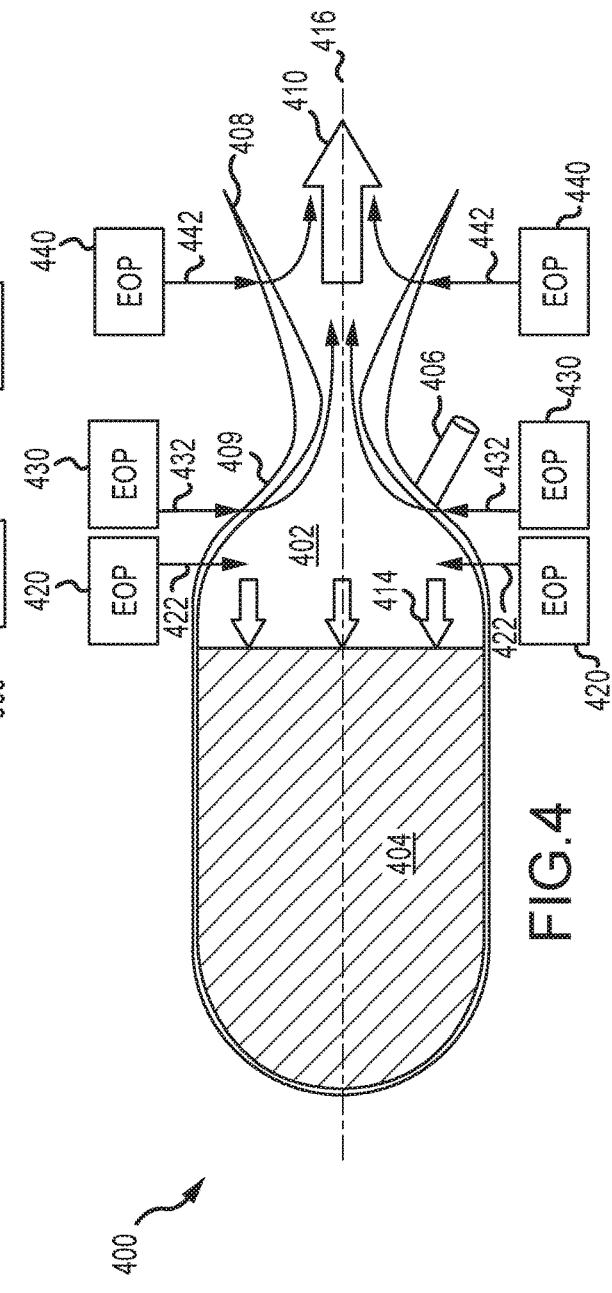

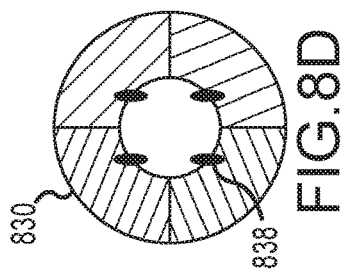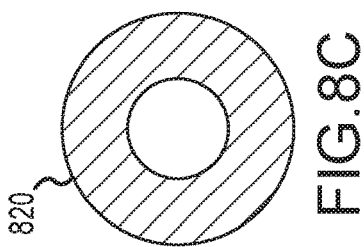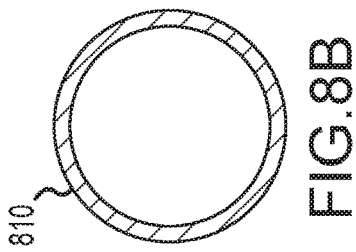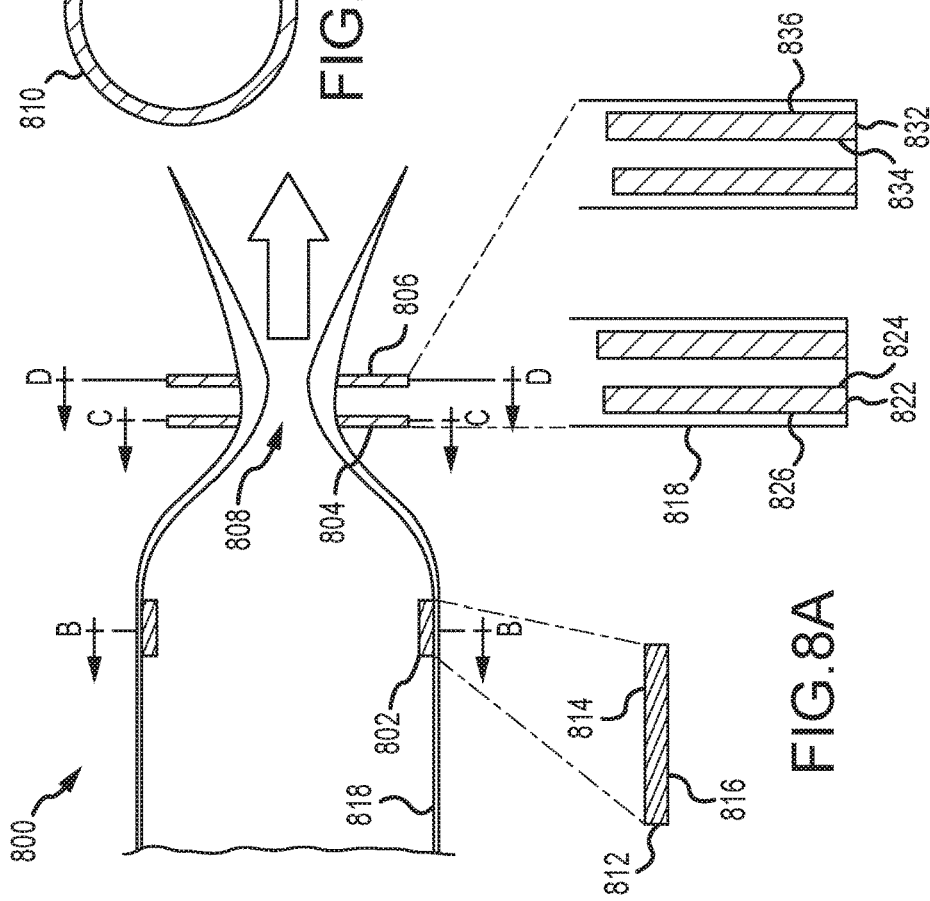

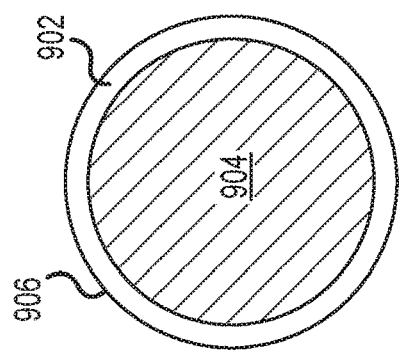
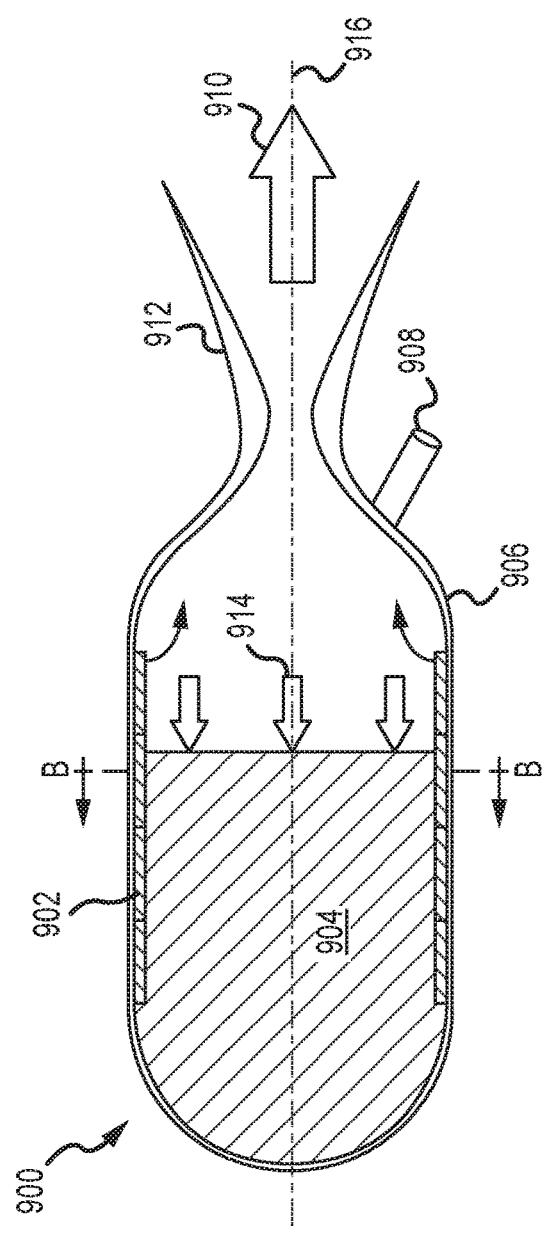

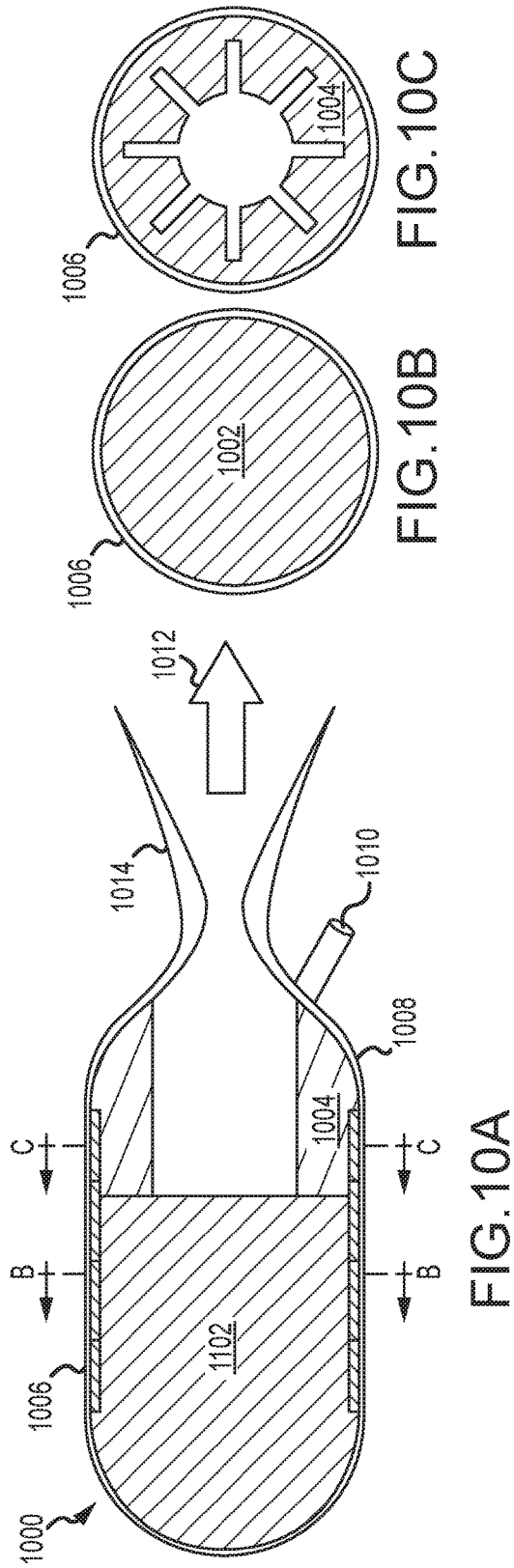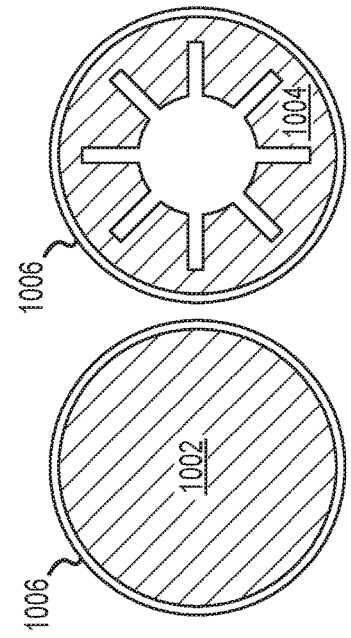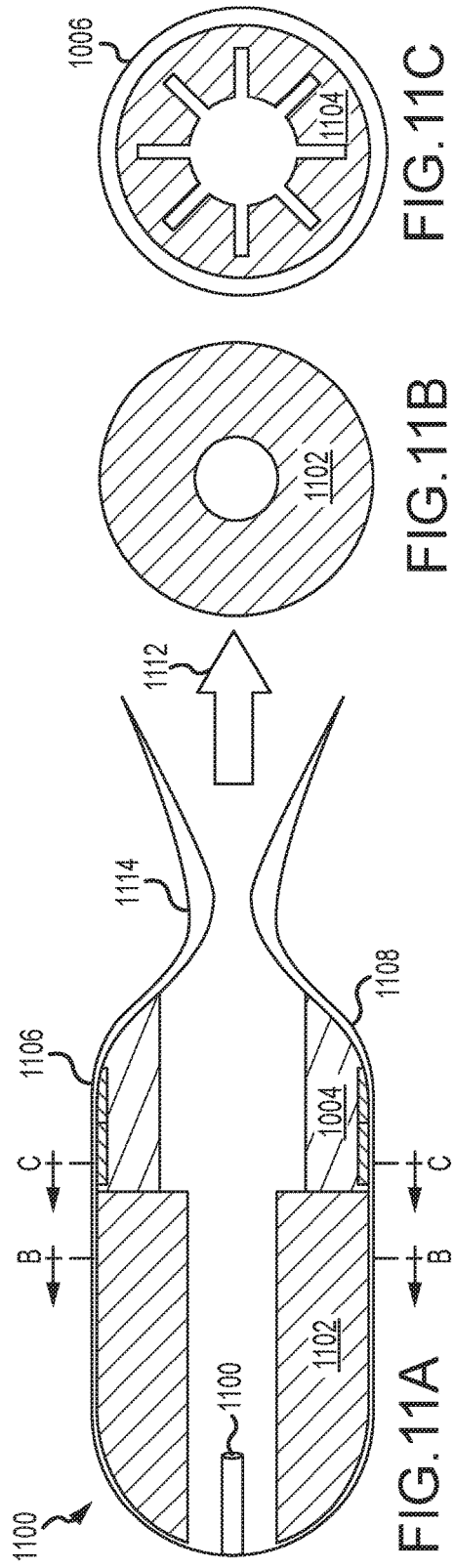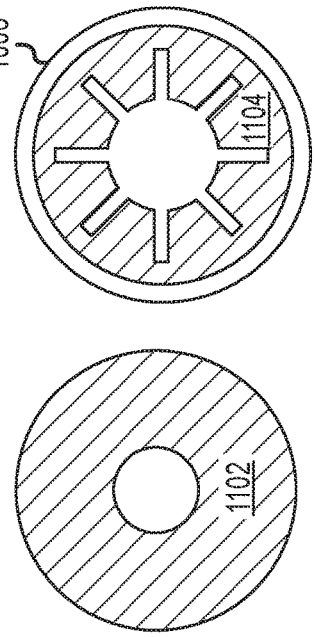

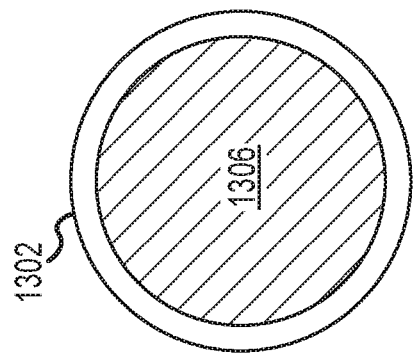
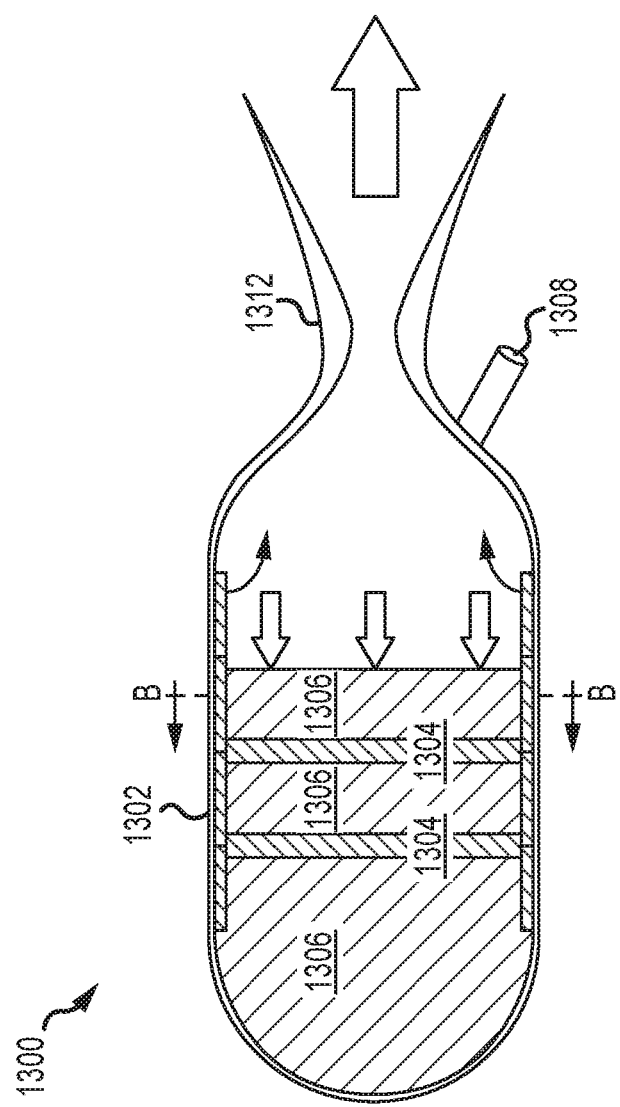

United States Patent US 10,563,617 B2

ELECTRICALLY OPERATED PROPELLANT FOR SOLID ROCKET MOTOR THRUST MANAGEMENT

BACKGROUND OF THE INVENTION

Field of the Invention

This invention relates to solid rocket motors (SRMs) and more particularly to the use of electrically operated propellants in combination with SRM propellants to throttle the thrust by injecting mass upstream of the nozzle throat or at the throat to reduce effective throat area At to increase chamber pressure Pc or downstream of the throat to provide thrust vector control.

Description of the Related Art

Solid rocket motors (SRMs) ignite and burn SRM propellants to generate high-pressure gas that is accelerated and expelled through a nozzle to provide thrust. One type of solid propellant is a combination of oxidizer, fuel, binder and additives. The oxidizer provides oxygen required to burn the fuel. The most common oxidizer for these propellants is a solid ammonium perchlorate (AP). The binder provides a structural material to bind the fuel and oxidizer. The binder itself is a fuel. Additional fuel may or may not be required. Additives may be used for a variety of purposes including to assist curing of the propellant, to control the burn rate, etc. These are generically referred to as composite solid propellants. Another type of solid propellant is a combination of nitroglycerin and nitrocellulose mixed with other additives into a generally homogeneous material. This class of propellant is generically referred to as double base solid propellant. The invention is not limited to any type of solid propellant and would be equally applicable to any other type of oxidizer, binder, or additive combination.

SRM propellants are ignited thermally (e.g., a burn wire and secondary charge) and burn vigorously to completion. These propellants typically exhibit a designed burn rate and consume substantially all of the propellant. Once ignited, the SRM propellants cannot be "turned off" except by a violent and uncontrolled depressurization.

Referring now to FIG. 1, a solid rocket motor 10 includes a combustion chamber 12, a mass or "grain" of solid rocket motor propellant 14 in the chamber in a circular perforate or "CP" configuration, a thermal igniter 16 positioned at the head end of the motor and a nozzle 18 coupled through a dome 19 to the chamber to expel the gas 20 produced by the burning propellant 14. Nozzle 18 includes a throat 22 that pinches down to a minimum cross-section to accelerate the velocity of the mass passing from the combustion chamber to the atmosphere. In SRMs the nozzle provides for "choked flow", which occurs when a gas velocity reaches the speed of sound in the gas as it flows through the throat. As shown, the nozzle is a convergent-divergent nozzle that accelerates the hot, pressurized gas passing through the throat to a higher supersonic speed by converting the heat energy of the flow into kinetic energy. The CP grain burns in a radial direction 24 away from a longitudinal axis 26 of the motor. The cross-section of the CP may be circular or have a different pattern such as "fins" or a "star", which increase the surface area, hence rate of consumption.

Referring now to FIG. 2, a solid rocket motor 30 includes a combustion chamber 32, a mass or "grain" of solid rocket motor propellant 34 in the chamber in an "end-burner" configuration, a thermal igniter 36 and a nozzle 38 coupled through a dome 39 to the chamber to expel the gas 40 produced by the burning propellant 34. The thermal igniter 36 may be mounted through the dome outside the motor as shown or may be a bag igniter inside the motor. Nozzle 38 includes a throat 42 that pinches down to a minimum cross-section to accelerate the velocity of the mass passing from the combustion chamber to the atmosphere. The "end-burner" configuration burns in an axial direction 44 along a longitudinal axis 46 of the motor.

Solid rocket motors may have a hybrid configuration comprising forward and aft sections of different grain designs. For example, the aft section may be a star or fin variant of a CP grain designed to be consumed very quickly and product high thrust whereas the forward section may be a CP or end-burner grain design to be consumed more slowly and produce a lower steady-state thrust. Both sections are ignited at essentially the same time to produce a peak thrust to launch the rocket. The aft section burns out and the forward section continues to burn. There can be many variants on this hybrid configuration.

Solid rocket motors operate by designing to a desired pressure, which is achieved when the mass discharged through the nozzle is equal to the mass generated in the chamber or:

$$\dot{m}_d = \dot{m}_g$$

The mass discharged can be calculated with the equation:

$$\dot{m}_d = \frac{P_c A_t}{c^*}$$

Where Pc is the chamber pressure, At is the effective nozzle throat area and c* is called the characteristic velocity, which is a function of the propellant gas temperature and molecular mass and is fixed by the propellant formulation. The mass generated is a function of the motor burn rate, r. The burn rate is the rate at which the surface regresses and is a function of the pressure in the motor. Experimentally, the burn rate depends on pressure $P_c$ by the equation:

$$r = a P_c^n$$

The values of a and n are experimentally determined constants found by testing the propellant. These values are known to the motor designer. "n" is referred to as the burn rate exponent. The mass generated is calculated from the burn surface area $A_b$, the solid propellant density $p_p$ and the burn rate r by:

$$\dot{m}_g = p_p A_b r$$

Substituting in the burn rate r gives the equation as:

$$\dot{m}_g = p_p A_b a P_c^n$$

Equating mass generated to mass discharged and solving for the chamber pressure yields:

$$P_c = \left[\frac{c^* p_p A_b a}{A_t}\right]^{\frac{1}{1-n}} \quad (1)$$

This is a well-known equation for computing the pressure in a solid rocket motor. It is simplified somewhat but captures the interactions of the main parameters. In normal operation of a solid rocket motor all the parameters stay the same except for burn area $A_b$. As the propellant regresses the area may change (increase or decrease depending on the initial shape) and the pressure will then change according to this equation. Thrust is directly proportional to chamber pressure.

The magnitude of the thrust can be controlled by varying the effective nozzle throat area At. Typical approaches may use a complex system of valves, referred to as a "pintle", to physically control the throat area or a system of valves to inject a gas into the nozzle throat to control the effective throat area At. The direction of the thrust can be manipulated by thrust vector control (TVC). TVC can be achieved by gimballing the nozzle, reactive fluid injection down stream of the throat, auxiliary motors, exhaust vanes or aerodynamic vanes.

U.S. Pat. No. 8,539,751 entitled "Methods of Controlling Thrust in a Rocket Motor" discloses a propulsion thrust control system and method for controlling thrust in a rocket motor that includes configuring valves of an energized rocket motor to an initial total valve area according to a total thrust command. The total thrust command is converted into a commanded propellant mass flow discharge rate. A varying total valve area is computed from an error between the commanded propellant mass flow discharge rate and a calculated propellant mass flow discharge rate. The valves are reconfigured according to a distribution of the varying total valve area. The propulsion system includes a pressure vessel with valves and a controller for regulating the valve area according to a propellant mass flow discharge rate from the pressure vessel.

U.S. Pat. No. 7,464,535 entitled "Rocket Motor Nozzle Throat Area Control System and Method", which discloses a solid rocket motor including a combustion chamber, in which propellant is ignited to produce combustion gas, and a nozzle having a throat with an effective flow area, implements a system and method to inject gas into the nozzle throat to control its effective cross sectional flow area. Controlling the effective cross sectional flow area of the nozzle throat in turn controls combustion chamber pressure, thus the burn rate of the propellant in the combustion chamber, and thus the thrust generated thereby. As shown in FIG. 1, high-pressure gas is bled from the combustion chamber and injected into the nozzle throat through a control valve.

U.S. Pat. No. 3,759,039 entitled "Thrust Control and Modulation System" discloses a device, more particularly a thrust control system, wherein gases bled from the rocket motor combustion chamber are thereafter conduited to a canister having a perforated solid propellant grain therein, which is combusted by the gases bled from the main chamber and thereafter conducted to discharges arranged with respect to the rocket motor to provide thrust vector control, roll and/or pitch control and thrust modulation. Associated valve control means is also provided. As shown in FIG. 3, the valve control means may inject the gases from the perforated solid grain propellant at the throat to control effective throat area or downstream of the throat to provide thrust vector control.

U.S. Pat. No. 3,031,842 entitled "Thrust Control for Solid Rocket" and U.S. Pat. No. 3,167,912 also entitled "Thrust Control for Solid Rocket" include auxiliary chambers inside or attached to a solid rocket motor chamber to control the thrust by exhausting material from these auxiliary chambers into the solid rocket motor chamber. These systems include complex valves and other piping or flow areas in order to accomplish exhausting the auxiliary propellant combustion gas into the solid rocket motor chamber.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides for the use of electrically operated propellant (EOP) to supplement the thrust provided by solid rocket motor (SRM) propellant to manage thrust produced by a SRM. The gas produced by burning the electrically operated propellant may be injected upstream of the nozzle to add mass and increase chamber pressure Pc, injected at the throat of the nozzle to reduce the effect throat area At to increase chamber pressure Pc or injected downstream of the throat to provide thrust vector control or a combination thereof. The capability to selectively inject gas at either the throat or upstream of the throat provides both a gross and fine thrust adjustment. In a typical embodiment, a total mass of electrically operated propellant is less than 5% of a total mass of SRM propellant and a maximum additional instantaneous thrust is less than 25% of a steady-state thrust provided by burning of the SRM propellant.

Certain types of electrically operated propellants can be turned on and off provided the chamber pressure Pc does not exceed a self-sustaining threshold pressure eliminating the requirement for physical control valves. Certain types of ionic perchlorate-based electrically operated propellants have demonstrated threshold pressures of at least 500, 1,000, 1,500 and greater than 2,000 psi.

The SRM can have any configuration e.g., unitary, hybrid or pulsed and any grain design e.g., pure CP, CP variant such as stars or fins to increase consumption or end-burner. The variants on the combinations of the motor configuration and grain design are many. The electrically operated propellant and electrical ignition may be configured to supplement the burning of the SRM propellant in any such variant.

The electrically operated propellant and electrical ignition may, in general, be configured to produce either a choked or unchoked flow of gas to be injected into the chamber or downstream of the nozzle.

For choked flow, the electrically operated propellant is burned in a separate mini combustion chamber and the gas is expelled through a nozzle into the main combustion chamber. The electrical ignition may comprise electrodes of varying configurations or an EM source.

For unchoked flow, the electrically operated propellant is positioned and burned inside the main combustion chamber. In an embodiment, a thin sheet of electrically operated propellant is disposed between a pair of electrodes at least one of which is a mesh electrode that provides a greater current density than the other electrode to initiate combustion of the electrically operated propellant at the mesh electrode. In one configuration, the electrodes are placed on the front and back surfaces of a disk (thin axially) of electrically operated propellant. In another configuration, the electrodes are placed on the inner and outer surfaces of a cylinder (thin radially) of electrically operated propellant. In either the unitary, hybrid or pulsed motor configurations, cylindrical sections of electrically operated propellant can be formed around and along the SRM propellant. Consumption of the SRM propellant exposes the cylindrical sections, which can then be ignited to supplement the thrust produced by the SRM propellant.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1a and 1b, as described above, are a depiction of a conventional circular perforate (CP) solid rocket motor (SRM);

FIG. 2 as described above is a depiction of a conventional end-burner solid rocket motor (SRM);

FIG. 3 is an illustration of an embodiment of a CP SRM using electrically operated propellant for thrust management;

FIG. 4 is an illustration of an embodiment of an end-burner SRM using electrically operated propellant for thrust management;

FIGS. 8a through 8d are side and end sectional views of a SRM (CP or end-burner) provided with thin sheet electrically operated propellant to add mass to increase Pc, to reduce the effect throat area At and to provide TVC, respectively;

FIGS. 9a and 9b are side and end sectional views of an end-burner SRM provided with cylindrical sections of electrically operated propellant that are exposed as the burning SRM propellant regresses;

FIGS. 10a and 10b-10c are side and end sectional views of a hybrid fin CP and end-burner SRM provided with annular sections of electrically operated propellant that are exposed when the CP grain is consumed and then as the end-burner grain regresses;

FIGS. 11a and 11b-11c are side and end sectional views of a hybrid fin CP/CP SRM provided with annular sections of electrically operated propellant that are exposed when the fin CP grain is consumed;

FIGS. 13a and 13b are side and end sectional views of a pulsed SRM provided with annular sections of electrically operated propellant that are exposed as each section of the pulsed SRM propellant regresses.

DETAILED DESCRIPTION OF THE INVENTION

Figure 5A:
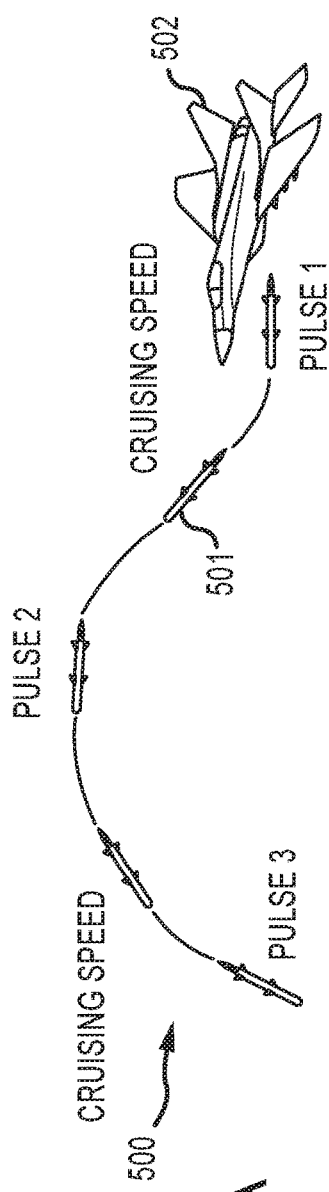
FIGS. 5a and 5b are illustrations of an embodiment of missile flight and Pc/thrust as augmented with electrically operated propellant.

The present invention describes the use of electrically operated propellant (EOP) to supplement the thrust provided by solid rocket motor (SRM) propellant to manage thrust produced by a SRM. The gas produced by burning the electrically operated propellant may be injected upstream of the nozzle to add mass and increase chamber pressure Pc, injected at the throat of the nozzle to reduce the effect throat area At to increase chamber pressure Pc or injected downstream of the throat to provide thrust vector control or a combination thereof. Certain types of electrically operated propellants can be turned on and off provided the chamber pressure Pc does not exceed a self-sustaining threshold pressure eliminating the requirement for physical control valves. The idea is to use a small amount of electrically operated propellant (<5% of the total mass of the SRM propellant) so as to not materially affect the overall design and construct of the SRM or rocket while providing the capability to flexibly manage (in time and amplitude) the thrust produced by the SRM without a complex valve system.

Consider adding a small amount of mass to the combustion chamber. Effectively mass generated is increased. Assume the amount added from the electrically operated propellant is a fraction of the mass generated by the SRM propellant and call that fraction $e_p$. This would modify equation 1 above to:

$$P_c = \left[\frac{(1+e_p)c^* \rho_p A_b a}{A_t}\right]^{\frac{1}{1-n}} \quad (2)$$

The additional mass will increase the pressure by a magnitude dependent on the exponent. The practical range of burn rate exponents, n is ~0.25 to 0.9. If n is small, say 0.25, than the exponent would be equal to 1/(1−0.25) or 1.33. So an additional mass flow rate (MFR) of 1% generated using electric propellant would increase the chamber pressure Pc by a factor of 1.01 raised to the 1.33 power or 1.0133. However, if n is large, say 0.75 than the exponent would be equal to 1/(1×0.75) or 4. An additional MFR or 1% from electric propellant would increase the pressure Pc by a factor of 1.01 raised to the 4 power or ~1.04.

If the mass is added just upstream of the throat (at the throat) the additional mass would have an aerodynamic effect that effectively makes the throat smaller thereby reducing At, which would in turn increase pressure Pc. For example if you could aerodynamically decrease the effective throat size by 1 or 2% it would increase the pressure by 4 to 8% if the exponent were 0.75. Furthermore, studies have shown that an additional MFR of 1% at the throat produces a 3-4% reduction in At, and thus a commensurately larger increase in Pc.

The addition of mass on the downstream side of the throat (outside the chamber) will not change the chamber pressure Pc. However, the injection of such mass downstream can be used for thrust vector control (TVC). The mass would be injected into the nozzle at different azimuths around the nozzle. The mass injection deflects the gas from the chamber and changes the thrust vector e.g., adding mass at one azimuth will push the vector towards the opposite azimuth. Injecting gas or liquid into the nozzle downstream of the throat is a well-known way of getting thrust vector control. Using electric operated propellant is an alternate approach that does not require the valves needed for a conventional liquid or gas system.

Electrically operated propellants are ignited by application of heat and an electric input. In a simple configuration, a voltage is applied between parallel wires embedded in the propellant. This produces ohmic heating that increases the temperature of the propellant. Application of the voltage across the propellant creates a current density (J)=current (I)/area (A) of the propellant. The current density J must exceed an ignition threshold of the propellant to ignite and burn. To support electrical operation, the oxidizer is "ionic" in the sense of providing free-flowing ions necessary for electrical control. The burn rate of the propellant may be controlled via the electric input. A challenge to achieve wide spread use is to provide an electrode configuration that provides for control of the burn rate and efficient consumption of substantially all of the propellant, and one that is scalable to combust greater propellant mass to support larger gas generation systems.

Certain formulations of the propellant, and more specifically the oxidizer, allow combustion to be extinguished by interruption of the electric input as long as the chamber pressure remains less than a self-sustaining threshold pressure. The propellant may be reignited by reapplication of the electric input. Sawka's hydroxyl-ammonium nitrate (HAN) based propellant (U.S. Pat. No. 8,857,338) exhibits a threshold of about 150 psi. Villarreal's perchlorate-based propellant (U.S. Pat. No. 8,950,329), which is hereby incorporated by reference, can be configured to exhibit a threshold greater than 200, 500, 1,500 and 2,000 psi. These higher threshold pressures allow for more practical applications in which the combustion may be turned on and off at elevated chamber pressures.

An EOP system includes a mass of electrically operated propellant and an electric ignition to produce choked or unchoked flow of gas. Each EOP system may be configured as 1-shot device that once ignited rapidly consumes all of the propellant to deliver a shot of gas. Alternately, each EOP system may be configured as a controllable device that can be turned on and off and throttled to delivery one or more gas flows at varying MFRs. One or more EOP systems may be configured to inject gas upstream of the nozzle throat discrete on contiguously around the chamber to increase mass or reduce At. Multiple EOP systems are required to inject gas downstream of the nozzle throat at discrete locations around the nozzle to perform TVC.

Referring now to FIG. 3, an embodiment of a solid rocket motor 300 includes a combustion chamber 302, a single mass or "grain" of solid rocket motor propellant 304 in the chamber in a circular perforate or "CP" configuration, and a nozzle 306 coupled through a dome 308 to the chamber to expel the gas 310 produced by the burning propellant 304. Nozzle 306 includes a throat 312 that pinches down to a minimum cross-section to accelerate the velocity of the mass passing from the combustion chamber to the atmosphere. The nozzle may be configured with many shapes including but not limited to a convergent-divergent nozzle to provide choked flow. The CP grain burns in a radial direction 314 away from a longitudinal axis 316 of the motor. The cross-section of the CP may be circular or have a different pattern such as "fins" or a "star", which increase the surface area, hence rate of consumption.

A first EOP system 320 is positioned at the head end of the SRM to inject gas 322 axially into combustion chamber 302. As shown, the EOP system 320 doubles as the thermal igniter to ignite SRM propellant 304. The EOP system 320 in an ignition condition is ignited and produces hot gas to ignite SRM propellant 304. The EOP system 320 may be turned off until supplemental mass, hence thrust is required. If an EOP system 320 is not so positioned, a conventional thermal igniter as shown in FIG. 1 may be required to ignite the SRM propellant 304.

Second one or more EOP systems 330 are positioned to inject gas 332 just upstream of nozzle throat 312 to reduce the effective nozzle throat area At. Gas 322 is preferably injected from all sides around the nozzle, either discretely or contiguously. This can be accomplished with N EOP systems and N discrete injection apertures or with 1 to N EOP systems and a single contiguous injection aperture around the nozzle.

A third plurality of EOP systems 340 is positioned to inject gas 342 at discrete locations downstream of nozzle throat 312 to implement thrust vector control (TVC).

In general, any one or more of these systems can be implemented in a given SRM to manage thrust produced by the SRM propellant. For example, different EOP systems may be configured to inject gas both just upstream of the nozzle throat 312 to provide a gross thrust adjustment and further upstream in the chamber itself to provide a fine adjustment. One or both of these systems to increase chamber pressure Pc may be used in combination with a system positioned downstream to provide TVC.

Referring now to FIG. 4, an embodiment of a solid rocket motor 400 includes a combustion chamber 402, a single mass or "grain" of solid rocket motor propellant 404 in the chamber in an "end-burner" configuration, a thermal igniter 406 and a nozzle 408 coupled through a dome 409 to the chamber to expel gas 410 produced by burning propellant 404. The thermal igniter 406 may be mounted through the dome outside the motor as shown or may be a bag igniter inside the motor. Nozzle 408 includes a throat 412 that pinches down to a minimum cross-section to accelerate the velocity of the mass passing from the combustion chamber to the atmosphere. The "end-burner" configuration burns in an axial direction 414 along a longitudinal axis 416 of the motor.

A first one or more EOP system 420 is positioned to inject gas 422 well upstream of the nozzle throat 412 to increase the mass in the combustion chamber. Gas 422 is preferably injected from all sides around the nozzle, either discretely or contiguously. This can be accomplished with N EOP systems and N discrete injection apertures or with 1 to N EOP systems and a single contiguous injection aperture around the nozzle.

Second one or more EOP systems 430 are positioned to inject gas 432 just upstream of nozzle throat 412 to reduce the effective nozzle throat area At. Gas 322 is preferably injected from all sides around the nozzle, either discretely or contiguously. This can be accomplished with N EOP systems and N discrete injection apertures or with 1 to N EOP systems and a single contiguous injection aperture around the nozzle.

A third plurality of EOP systems 440 is positioned to inject gas 442 at discrete locations downstream of nozzle throat 412 to implement thrust vector control (TVC).

Conceptually the use of EOP systems to inject gas into CP or end-burner unitary, hybrid or pulsed SRMs is no different. The most efficient configuration of the EOP systems for the different motor and different grain configurations may differ.

Figure 5B:
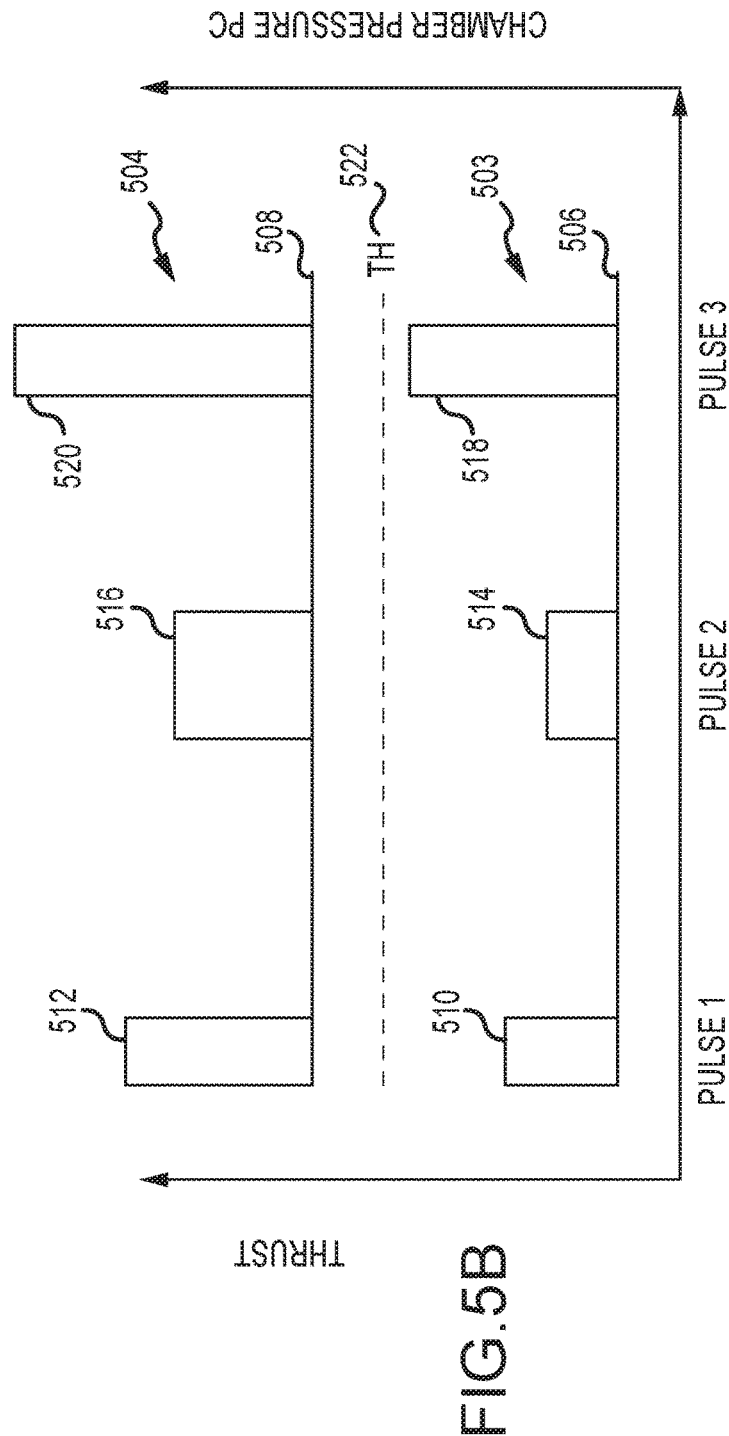

Referring now to FIGS. 5a and 5b, an exemplary missile flight 500 for a missile 501 from an aircraft 502 is achieved with a chamber pressure Pc profile 503 and thrust profile 504 produced by burning SRM propellant as augmented with electrically operated propellant. For purposes of simplicity, burning the SRM propellant produces a constant MFR that generates a constant chamber pressure 506, which in turn produces a constant thrust 508. At initial fly out (launch), an EOP system is ignited to inject gas to provide an increased chamber pressure 510, hence increased thrust 512 to reach cruising speed. Missile flight continues for some period of time under SRM propellant thrust only. At some point, either the same EOP system or a different EOP system is ignited to inject gas to provide an increased chamber pressure 514, hence increased thrust 516 to gain speed and range. Missile flight continues for some period of time under SRM propellant thrust only. During end-game maneuvers, either the same EOP system or a different EOP system is ignited to inject gas to provide an increased chamber pressure 518, hence increased thrust 520 to execute a high-g maneuver to prosecute the target. The peak chamber pressure Pc must stay below a self-sustaining threshold pressure 522 of the electrically operated propellant in order to preserve the ability to extinguish the propellant by interrupting the electrical signal.

The EOP system may, in general, be configured to produce either a choked or unchoked flow of gas to be injected into the chamber or downstream of the nozzle. For choked flow, the electrically operated propellant is burned in a separate mini combustion chamber and the gas is expelled through a nozzle into the main combustion chamber. The electrical ignition may comprise electrodes of varying configurations (e.g. parallel wires, parallel plates, angled plates, parallel or angled plates (U.S. Ser. No. 15/191,421) with an actuator to maintain positive contact of the electrically operated propellant with the plates (U.S. Ser. No. 15/247, 194), etc.) or an EM source (Ser. No 15/240,932), which are hereby incorporated by reference.

Figure 6:
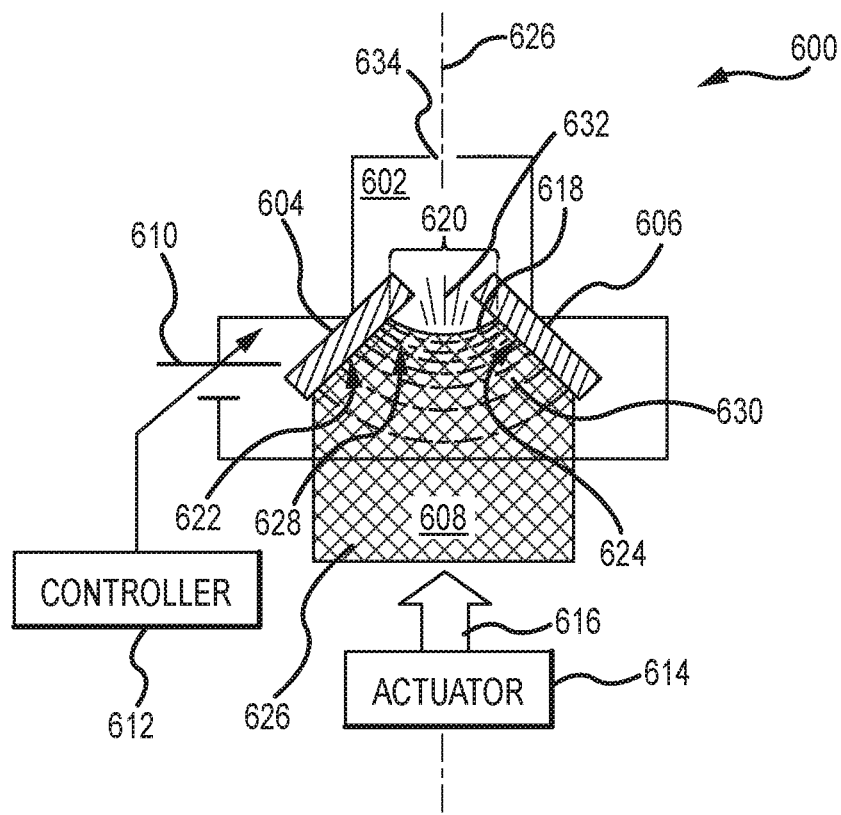
FIG. 6 is an illustration of an embodiment of an electrically operated propellant device for injecting gas.

Referring now to FIG. 6, an embodiment of an EOP system 600 for producing a choked flow of gas 601 comprises a combustion chamber 602, a pair of electrodes 604 and 606 and a mass of electrically operated propellant 608 positioned between the electrodes. The electrodes are coupled to an electrical power source 610 (e.g. a variable voltage source), which is controlled by a controller 612. An actuator 614 is positioned to apply a linear force 616 to the backside of the propellant to displace the propellant to maintain positive contact between the propellant and the electrodes. The actuator may, for example, comprise various springs, linear actuators, screw drives, rotating rods, gas pressure or hydraulic pistons to produce the requisite linear force or displacement. In certain embodiments, the pressurized gas may be diverted behind the propellant to assist the actuator.

Electrodes 604 and 3606 are angled plate electrodes that extend into propellant 608 at an angle α roughly to an ignition surface 618 of the propellant at a minimum gap 620 between the electrodes. The minimum gap 620 is defined as the minimum gap between the electrodes that spans propellant. The angled contact surfaces 622 and 624 of the electrodes are symmetric about a plane 626 that extends into propellant 608.

The energized electrodes produce current (field) lines 628 that follow equipotential surfaces 630 that are ideally curved and unevenly spaced. The curvature is determined by the angle α and the conductivity of the propellant. Typical values of α are 10 to 80 degrees (where 0 degrees is the flat plate configuration shown in FIGS. 2a-2d). The spacing increases as the gap between the electrode increases and the concentration of field lines decreases. Irregularities or imperfections due, for example, to non-homogeneous propellant may induce small deviations in the curvature. One will note that the current (field) lines 628 are confined to the shallow volume where the electrodes are positioned and do not extend into the remaining bulk of the propellant 608. The equipotential surfaces 630 correspond to surfaces of uniform current density. The equipotential surface 630 at the minimum gap corresponds to the ignition surface 618 of uniform and maximum current density J that exceeds an ignition threshold of the propellant. The current density J decreases as the gap widens.

In an ignition condition, an electrical input is applied across electrodes 604 and 606 to ignite and burn substantially the entire ignition surface 618 between the electrodes at the minimum gap to produce gases 632 that pressurize the combustion chamber. These gases may be released from the chamber through an opening 634 such as an orifice or nozzle to produce the choked flow of gas 632. Actuator 614 applies linear force 616 to displace the mass of propellant 608 towards the electrodes to maintain positive contact between the propellant at the ignition surface 618 and the electrode contact surfaces 622 and 624. As the burning consumes the propellant at the ignition surface, the linear force displaces new propellant forward to maintain the ignition surface 618 between the electrodes to continue burning. The displacement tends to overcome any irregularities or imperfections caused, for example, by non-homogeneities in the propellant itself to drive the contour of the ignition surface 618 to the curved contour of the equipotential surface at the minimum gap. This mechanism is what ensures that substantially the entire ignition surface ignites and combusts, as opposed to localized combustion on the surface or back burn. Combustion of the propellant produces gases that pressurize the combustion chamber.

In a throttling condition, controller 612 varies the electrical input to increase or decrease the rate of combustion to increase or decrease the pressure in the combustion chamber. In an extinguishment condition, provided the pressure in the chamber does not exceed the propellant's self-sustaining threshold pressure, the controller interrupts the electrical input to extinguish combustion. The propellant may be reignited by turning power back on to produce a maximum current density J that exceeds the ignition threshold.

For unchoked flow, the electrically operated propellant is positioned and burned inside the main combustion chamber. In an embodiment, a thin sheet of electrically operated propellant is disposed between a pair of electrodes at least one of which is a mesh electrode that provides a greater current density than the other electrode to initiate combustion of the electrically operated propellant at the mesh electrode.

Figure 7:
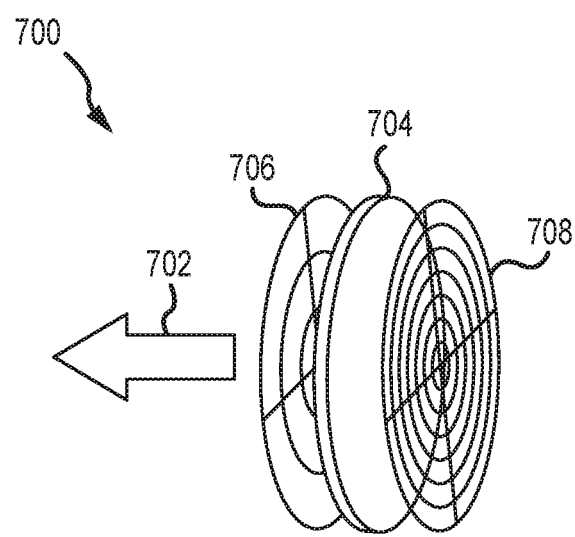
FIG. 7 is an illustration of an embodiment of a thin-sheet electrically operated propellant device for injecting gas.

Referring now to FIG. 7, a thin-sheet EOP system 700 for producing an unchoked flow of gas 702 may have a circular shape to fit within a cylindrical casing (i.e. the combustion chamber). This circular shape is provided in the form of thin sheets of material. The thin sheets are of sufficient thickness to account for degradation of a surface of the respective EOP system when not ignited but still exposed to high heat in the casing. For example, combustion of the SRM propellant charge may cause high heat in the casing, which will not ignite the electrically operated propellant of the EOP system 700 when an electrical input is not applied. Nonetheless, a sacrificial portion, such as a thin portion, of the EOP system exposed to the high heat may degrade.

Each EOP system 700 includes an electrically operated propellant 704 and corresponding electrodes 706 and 708. The electrically operated propellant 704 is configured (a) to ignite in response to an electrical input and (b) to generate gas when ignited. The electrically operated propellant 704 is configured to transition from an unignited state to an ignited state when a respective electrical input is applied between the respective pair of electrodes 706 and 708. The electrically operated propellant 704 is also configured to maintain the unignited state when the electrical input is not applied. Further, the electrically operated propellant 704 is configured to transition from the ignited state to the unignited state when exposed to pressure less than a self-sustain threshold pressure, such as 200 psi, and the respective electrical input is not being applied.

As depicted, the electrodes 706 and 708 are mesh electrodes. Each electrode 706 and 708 covers a full opposing side of the electrically operated propellant 704, allowing electric current to move across the entirety of the electrically operated propellant 704. The depicted mesh is wire mesh having hole there through, such as being a circular or crisscrossed wire mesh.

In the depicted embodiment, initial burning takes place only adjacent the first electrode 706 that is a coarse mesh electrode, while initial burning does not take place at the second electrode 708 that is a fine mesh electrode. Once the electrically operated propellant 704 is ignited, burning will take place adjacent both electrodes 706 and 708. As used herein, current density J is the electric current per unit area of cross section. When there is a disparity between current densities provided by the electrodes of a pair of electrodes, electrical input may be provided in one direction across the electrodes rather than in the opposite direction across the electrodes to vary the speed and intensity of the burn.

The basic thin-sheet EOP system 700 may be adapted to inject gas to the casing (combustion chamber) or downstream of the nozzle throat. In general, a hole is formed in the middle of the thin sheets to accommodate placement of the EOP system 700 either around the SRM propellant or around the nozzle. The thin sheet of electrically operated propellant and the electrodes are configured as an annular cylinder having radii R1 and R2 with R1>R2 and an axial thickness t. In one configuration, the electrodes are placed on the front and back surfaces of a disk (thin axially, R1−R2>t) of electrically operated propellant. The disk configuration may, for example, be placed around the nozzle. In another configuration, the electrodes are placed on the inner and outer surfaces of a cylinder (thin radially R1−R2<t) of electrically operated propellant. In either the unitary, hybrid or pulsed motor configurations, cylindrical sections of electrically operated propellant can be formed around and along the SRM propellant. Consumption of the SRM propellant exposes the cylindrical sections, which can then be ignited to supplement the thrust produced by the SRM propellant.

Referring now to FIGS. 8a-8d, an embodiment of a SRM 800 is provided with thin-sheet EOP systems 802, 804 and 806 to inject gas upstream of a nozzle throat 808 to add mass, at the nozzle throat to reduce At and downstream of the nozzle thrust to provide TVC, respectively. The SRM propellant is not shown in order to emphasize the point that EOP injection can be used with any SRM motor and propellant configuration.

Thin-sheet EOP system 802 comprises a cylinder 810 of electrically operated propellant 812 in which R1−R2<t1. Mesh electrodes 814 and 816 are placed on the inner and outer surfaces of propellant 812 inside a casing 818 (combustion chamber). The inner mesh electrode 814 is configured to provide a greater current density than the outer mesh electrode 816 to initiate combustion of the electrically operated propellant at the inner surface. Ignition of EOP system 802 produces gas that adds mass into the casing 818 upstream of the nozzle to increase chamber pressure Pc. The cylinder and electrodes may be contiguous or segmented.

Thin-sheet EOP system 804 comprises a pair of disks 820 of electrically operated propellant 822 in which R3−R4>t2. Mesh electrodes 824 and 826 are placed on the front and back surfaces of propellant 822 for each disk. The front mesh electrode 824 is configured to provide a greater current density than the back mesh electrode 826 to initiate combustion of the electrically operated propellant at the inner surface. The dome or nozzle is configured such that the disk is operably coupled into the combustion chamber for unchoked gas flow. Ignition of EOP system 804 produces gas that is injected in to the combustion chamber at the nozzle throat to reduce At. The disks and electrodes may be contiguous or segmented.

Thin-sheet EOP system 806 comprises a pair of disks 830 of electrically operated propellant 832 in which R3−R4>t2. Mesh electrodes 834 and 836 are placed on the front and back surfaces of propellant 832 for each disk. The front mesh electrode 834 is configured to provide a greater current density than the back mesh electrode 836 to initiate combustion of the electrically operated propellant at the inner surface. The disks and electrodes are segmented and configured to inject gas through discrete openings 838 into the exhaust to perform TVC.

Referring now to FIGS. 9a-9b, an embodiment of a unitary end-burner SRM 900 includes a plurality cylindrical thin-sheet EOP systems 902 formed around and along the length of a cylindrical SRM propellant 904 inside a casing 906 (combustion chamber). An end-burner thermal igniter 908 mounted inside or outside of the motor is configured to ignite SRM propellant 904, which in turn produces gas to pressurize the combustion chamber. The high-pressure gas 910 flows through nozzle 912 to produce thrust.

As SRM propellant 904 is consumed the propellant regresses in an axial direction 914 along a longitudinal axis 916 of the motor. As the propellant regresses, the cylindrical thin-sheet EOP systems 902 are exposed one after the other starting with the further aft system and working forward. As each EOP system 902 is exposed (to oxygen) it is capable of being ignited through application of an electrical input in the ignition condition. Each EOP system 902 is independently controllable to be used as a 1-shot device to generate a maximum impulse or as a controlled device to be turned on and off and throttled as required by the mission. Multiple EOP systems 904 could be used in combination to provide greater thrust capability. This configuration of cylindrical thin-sheet EOP systems has no impact on the motor casing and minimal impact on the mass of SRM propellant in the motor.

Referring now to FIGS. 10a-10c, an embodiment of a hybrid SRM 1000 includes a forward segment of SRM propellant 1002 configured as an end-burner and an aft segment of SRM propellant 1004 configured as a fin variant of a CP grain. A plurality of cylindrical thin-sheet EOP systems 1006 is formed around and along the length of both the aft and forward segments of SRM propellant 1002 and 1004 inside a casing 1008 (combustion chamber). An end-burner thermal igniter 1010 mounted inside or outside of the motor is configured to ignite both the aft and forward segments of SRM propellant 1002 and 1004 at essentially the same time to produce high pressure gas 1012 that flows through a nozzle 1014 to produce thrust. The end-burner propellant 1004 burns for a relatively long time e.g. the entire engagement, to produce a steady-state thrust. The fin CP grain 1006 is consumed relatively rapidly to rapidly accelerate the missile during fly-out. Once the fin CP grain 1006 is fully consumed, the furthest aft EOP system 1006 is exposed and capable of being ignited to provide additional mass to increase Pc and provide additional thrust. As the end-burner propellant 1004 is consumed, additional EOP systems 1006 are exposed and capable of being ignited to provide additional mass to increase Pc and provide additional thrust.

Referring now to FIGS. 11a-11c, an embodiment of a hybrid SRM 1100 includes a forward segment of SRM propellant 1102 configured as CP grain and an aft segment of SRM propellant 1104 configured as a fin variant of a CP grain that is consumed faster than the CP grain. A plurality of cylindrical thin-sheet EOP systems 1106 is formed around and along the length of only the aft segment of SRM propellant 1104 inside a casing 1108 (combustion chamber). A thermal igniter 1110 mounted inside or outside of the motor is configured to ignite both the aft and forward segments of SRM propellant 1102 and 1104 at essentially the same time to produce high-pressure gas 1112 that flows through a nozzle 1114 to produce thrust. The CP grain 1104 burns for a relatively long time e.g. the entire engagement, to produce a steady-state thrust. The fin CP grain 1106 is consumed relatively rapidly to rapidly accelerate the missile during fly-out. Once the fin CP grain 1106 is fully consumed, the EOP systems 1106 are exposed and capable of being ignited to provide additional mass to increase Pc and provide additional thrust.

Figure 12:
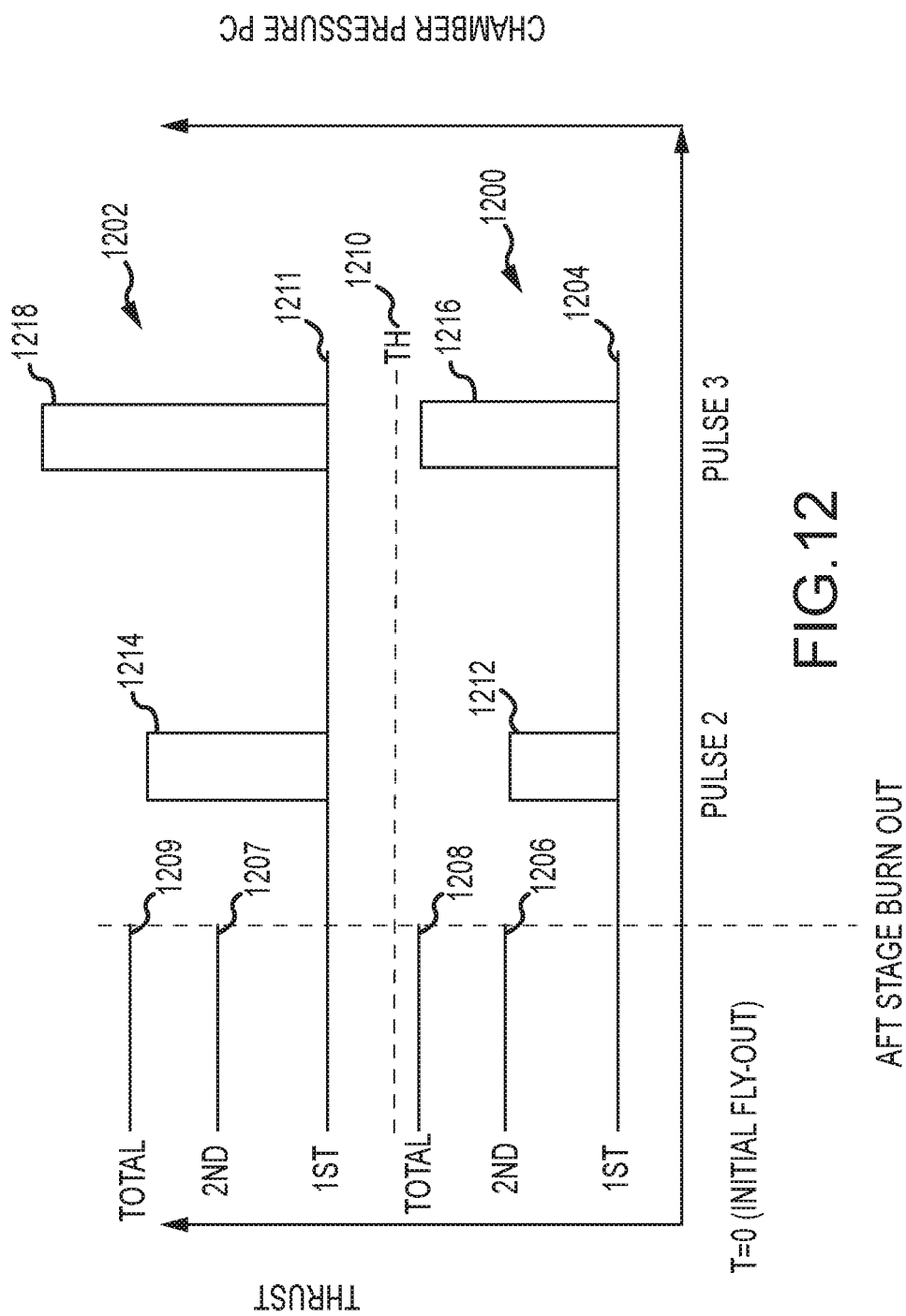
FIG. 12 is a plot of Pc/thrust as augmented with electrically operated propellant for the hybrid motor designs.

Referring now to FIG. 12, an exemplary missile flight is achieved with a chamber pressure Pc profile 1200 and thrust profile 1202 produced by burning forward and aft sections of SRM propellant as augmented with electrically operated propellant such as depicted in FIGS. 10a-10c and 11a-11c. At launch, both the forward and aft sections are ignited and burn. The forward section produces an amount of gas (mass) that generates a steady-state chamber pressure Pc 1204 and thrust 1211 whereas the aft section is consumed faster and produces a larger amount of gas (mass) that generates a transient chamber pressure Pc 1206 and thrust 1207 which sum together during initial fly-out to produce a total Pc 1208 and thrust 1209 to accelerate the missile to speed. The total PC 1208 must be less than the self-sustaining threshold pressure 1210 of the electrically operated propellant in order to retain the capability to extinguish the electrically operated propellant once ignited, and to reignite the propellant. At the end of fly-out, the aft section has been consumed and only the forward section produces mass to pressure the chamber and produce the steady-state Pc 1204 and thrust 1211. Consumption of the aft section has exposed one or more of the EOP systems, which can now be selectively controlled to inject gas into the chamber to, for example, increased chamber pressure 1212, hence increased thrust 1214 to gain speed and range and to inject gas to provide an increased chamber pressure 1216, hence increased thrust 1218 to execute a high-g maneuver to prosecute the target. Again the peak chamber pressure Pc must stay below a self-sustaining threshold pressure 1210 of the electrically operated propellant in order to preserve the ability to extinguish the propellant by interrupting the electrical signal.

Figure 14:
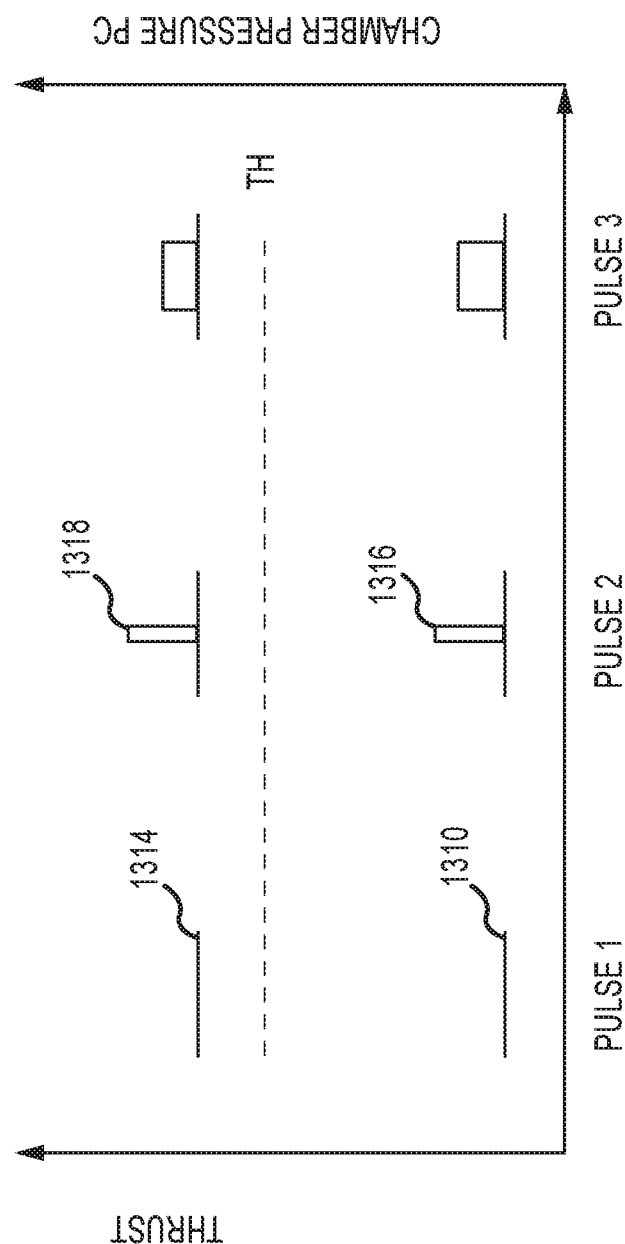
FIG. 14 is a plot of Pc/thrust as augmented with electrically operated propellant for the hybrid motor designs.

Referring now to FIGS. 13a-13b and 14, an embodiment of a pulsed SRM 1300 includes a plurality of cylindrical thin-sheet EOP systems 1302 to provide supplemental thrust. Other configurations of the EOP system may be used to add mass, reduce At or provide TVC for the pulsed SRM. Embodiments of the pulsed SRM are disclosed in U.S. Ser. No. 14/875,741 entitled "Electrically Operated Pulse Initiators and Ignition" filed Oct. 6, 2015, which is hereby incorporated by reference.

The pulsed motor uses electrically operated propellant initiators 1304, which are similar in construct and operation to the EOP systems but serve a different function. The initiators 1304 are used to both isolate segments of SRM propellant 1306 so that the segments can be individually initiated and to initiate combustion of at least some of the segments 1306 of SRM propellant. The aft segment 1306 is typically ignited with an end-burner igniter 1308. The initiator includes a thin sheet of electrically operated propellant disposed between a pair of mesh electrodes (the less dense mesh electrode facing forward to initiate burn adjacent the next segment). The sheet of electrically operated propellant serves as a barrier to isolate one segment of SRM propellant from the hot gases produced by another burning propellant. After the previous segment has been consumed, the initiator applies an electrical signal in an ignition condition to the thin sheet to ignite the electrically operated propellant, which in turn produces hot gasses that ignite the corresponding segment of SRM propellant. The consumption of each segment 1306 exposes one or more of the EOP systems 1302 so that they may be ignited to produce additional mass.

The ignition and consumption of each segment 1306 produces gas (mass) sufficient to pressure the combustion chamber to a chamber pressure 1310 to expel gas through a nozzle 1312 to produce a thrust pulse 1314. The level and duration of Pc/thrust depends on the grain configuration of each segment 1306. The timing of each pulse is controlled by its initiator. Each pulse may be augmented by igniting one or more of the EOP systems to produce a 1-shot impulse or a controlled pulse of pressure 1316 and thrust 1318. The combination of the pulsed motor with EOP thrust management provides a SRM with considerable capabilities to prosecute targets.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A solid rocket motor, comprising:
   a combustion chamber;
   a nozzle coupled to the combustion chamber, said nozzle having a throat with an effective throat area At;
   one or more segments of solid rocket motor (SRM) propellant within the combustion chamber;
   a thermal ignition coupled to at least one of the one or more segments of SRM propellant, each said segment of SRM propellant, once ignited, burns to completion to produce pressurized gas in the combustion chamber at a chamber pressure Pc that flows through the throat of the nozzle to produce thrust;
   an ionic perchlorate-based electrically operated propellant positioned in or directly coupled to the combustion chamber, said electrically operated propellant having a self-sustaining threshold pressure at which the propellant once ignited cannot be extinguished and below which the propellant is extinguished by interruption of an electrical signal, wherein the chamber pressure Pc remains below the self-sustaining threshold pressure; and
   an electrical ignition configured to apply the electrical input to the electrically operated propellant, wherein in an ignition condition the electrically operated propellant burns to produce gas to (a) add mass into the chamber upstream of the nozzle throat to increase the chamber pressure Pc, (b) reduce the effective throat area At to increase chamber pressure Pc or (c) to inject mass downstream of the nozzle throat to provide thrust vector control (TVC) or a combination thereof without the use of physical control valves, said electrical ignition configured in an extinguishment condition to interrupt the electrical input to extinguish the electrically operated propellant and reconfigured in the ignition condition to apply the electrical input to reignite the electrically operated propellant.

2. The solid rocket motor of claim 1, wherein said electrical ignition comprises a pair of electrodes and the electrically operated propellant is configured as a thin sheet disposed between the pair of electrodes, wherein at least one of said pair of electrodes is a mesh electrode that provides a greater current density than the other electrode to initiate combustion of the electrically operated propellant at the mesh electrode.

3. The solid rocket motor of claim 2, wherein said thin sheet of electrically operated propellant is configured as an annular cylinder having radii R1 and R2 with R1>R2, axial thickness t, and R1−R2>t, said pair of electrodes disposed on front and back surfaces of the annular cylinder of electrically operated propellant to initiate combustion at the front surface.

4. The solid rocket motor of claim 2, wherein said thin sheet of electrically operated propellant is configured as an annular cylinder having radii R1 and R2 with R1>R2, axial thickness t, and R1−R2<t, said pair of electrodes disposed on inner and outer surfaces of the annular cylinder of electrically operated propellant to initiate combustion at the inner surface.

5. The solid rocket motor of claim 2, wherein said electrical ignition is configured in said ignition condition to apply the electrical input to consume all of the thin sheet of electrically operated propellant to generate an impulse thrust condition or impulse TVC condition.

6. The solid rocket motor of claim 1, wherein a total mass of electrically operated propellant is less than 5% of a total mass of SRM propellant, wherein a maximum additional instantaneous thrust provided by burning the electrically operated propellant is less than 25% of a steady-state thrust provided by burning of the SRM propellant.

7. The solid rocket motor of claim 1, wherein the motor includes only a single segment of SRM propellant.

8. The solid rocket motor of claim 7, wherein the single segment of SRM propellant is configured as an end-burner, wherein said electrically operated propellant comprises a plurality of cylindrical sections of electrically operated propellant positioned around and along the single segment of SRM propellant, said electrical ignition comprising a like plurality of electrode pairs on opposing inner and outer surfaces of the cylindrical sections of electrically operated propellant of which at least one of each said pair is a mesh electrode that provides a greater current density than the other electrode to initiate combustion of the electrically operated propellant at the inner surface of the electrically operated propellant, wherein said thermal ignition is configured to ignite an aft surface of the single segment of SRM propellant to burn and regress axially in a forward direction to expose in sequence the inner surfaces of the cylindrical sections of the electrically operated propellant, wherein as each cylindrical section is exposed application of the electrical signal in the ignition condition ignites that cylindrical section to produce gas to add mass into the chamber.

9. The solid rocket motor of claim 1, wherein said motor comprises at least a first segment of SRM propellant having a first grain design and a second segment of SRM propellant positioned aft of the first segment and having a second grain design configured to be consumed more quickly than said first grain design, wherein said electrically operated propellant comprises at least one cylindrical section of electrically operated propellant positioned around and along the second segment of SRM propellant, said electrical ignition comprising at least one electrode pair on opposing inner and outer surfaces of the at least one cylindrical section of electrically operated propellant of which at least one of each said pair is a mesh electrode that provides a greater current density than the other electrode to initiate combustion of the electrically operated propellant at the inner surface of the electrically operated propellant, wherein said thermal ignition is configured to ignite the second segment of SRM propellant to burn and regress radially to expose the inner surface of the at least one cylindrical section of the electrically operated propellant, wherein as each of the at least one cylindrical section is exposed application of the electrical signal in the ignition condition ignites that cylindrical section to produce gas to add mass into the chamber to augment the combustion of the first segment of SRM propellant.

10. The solid rocket motor of claim 9, wherein said first segment of SRM propellant is configured as an end-burner, wherein said electrically operated propellant comprises a plurality of cylindrical sections of electrically operated propellant and electrode pairs positioned around and along both the first and second segments of SRM propellant.

11. The solid rocket motor of claim 1, wherein the motor comprises at least first and second segments of SRM propellant, wherein the electrical ignition comprises at least a first electrically operated propellant initiator operatively coupled to at least the second segment of SRM propellant, to initiate combustion in at least the second segment of SRM propellant, wherein the at least first and second segments of SRM propellant are operatively isolated from one another such that at least the first and second segments of SRM propellant can be individually initiated.

12. The solid rocket motor of claim 11, wherein said at least first and second segments of SRM propellant are configured as an end-burner, wherein at least said first electrically operated propellant initiator is positioned between said first and second segments of SRM propellant to isolate the first and second segments of SRM propellant.

13. The solid rocket motor of claim 12, wherein said electrically operated propellant comprises at least one cylindrical section of electrically operated propellant positioned around and along the first segment of SRM propellant, said electrical ignition comprising at least one electrode pair on opposing inner and outer surfaces of the at least one cylindrical section of electrically operated propellant of which at least one of each said pair is a mesh electrode that provides a greater current density than the other electrode to initiate combustion of the electrically operated propellant at the inner surface of the electrically operated propellant, wherein said thermal ignition is configured to ignite the first segment of SRM propellant to burn and regress axially until consumed at the first electrically operated propellant initiator to expose the inner surface of the at least one cylindrical section of the electrically operated propellant, wherein as each cylindrical section of electrically operated propellant is exposed application of the electrical signal in the ignition condition ignites that cylindrical section to produce gas to add mass into the chamber.

14. The solid rocket motor of claim 1, wherein the electrically operated propellant and electrical ignition are configured to both and selectively inject gas at the throat to reduce the effective area At of the throat to provide a coarse thrust adjustment and to add mass upstream of the throat to provide a fine thrust adjustment.

15. The solid rocket motor of claim 1, wherein the electrically operated propellant and electrical ignition are configured to add mass into the chamber upstream of the nozzle throat to increase the chamber pressure Pc to provide a thrust adjustment.

16. The solid rocket motor of claim 1, wherein the electrically operated propellant and electrical ignition are configured to inject gas at the throat to reduce the effective throat area At to increase the chamber pressure to provide a thrust adjustment.

17. The solid rocket motor of claim 1, wherein the electrically operated propellant and electrical ignition are configured to inject mass downstream of the nozzle throat to provide TVC.

18. A solid rocket motor, comprising:
   a combustion chamber;
   a nozzle coupled to the combustion chamber, said nozzle having a throat with an effective throat area At;
   one or more segments of solid rocket motor (SRM) propellant within the combustion chamber;
   a thermal ignition coupled to at least one of the one or more segments of SRM propellant, each said segment of SRM propellant, once ignited, burns to completion to produce pressurized gas in the combustion chamber at a chamber pressure Pc that flows through the throat of the nozzle to produce thrust;
   an ionic perchlorate-based electrically operated propellant positioned in or directly coupled to the combustion chamber, said electrically operated propellant having a self-sustaining threshold pressure at which the propellant once ignited cannot be extinguished and below which the electrically operated propellant is extinguished by interruption of an electrical input, wherein the chamber pressure Pc remains below the self-sustaining threshold pressure;
   an electrical ignition configured to apply the electrical input to the electrically operated propellant; and
   a controller configured in an ignition condition to apply the electrical input to the electrically operated propellant to burn and inject gas at the throat without the use of physical control valves to reduce the effective throat area At to increase chamber pressure Pc, which remains less than the self-sustaining threshold pressure, to increase thrust and in an extinguishment condition to interrupt the electrical input to extinguish the electrically operated propellant, said controller configured in an extinguishment condition to interrupt the electrical input to extinguish the electrically operated propellant and reconfigured in the ignition condition to apply the electrical input to reignite the electrically operated propellant.

19. A solid rocket motor, comprising:
   a combustion chamber;
   a nozzle coupled to the combustion chamber, said nozzle having a throat with an effective throat area At;
   one or more segments of solid rocket motor (SRM) propellant within the combustion chamber;
   a thermal ignition coupled to the one or more segments of SRM propellant, each said segment of SRM propellant, once ignited, burns to completion to produce pressurized gas in the combustion chamber at a chamber pressure Pc that flows through the throat of the nozzle to produce thrust;
   a plurality of cylindrical sections of ionic perchlorate-based electrically operated propellant positioned around and along the one or more 1 segments of SRM propellant within the combustion chamber, said electrically operated propellant having a self-sustaining threshold pressure at which the electrically operated propellant once ignited cannot be extinguished and below which the electrically operated propellant is extinguished by interruption of an electrical signal; and
   an electrical ignition comprising a plurality of electrode pairs on opposing inner and outer surfaces of the plurality of cylindrical sections of electrically operated propellant of which at least one of each said pair is a mesh electrode that provides a greater current density than the other electrode to initiate combustion of the electrically operated propellant at the inner surface of the electrically operated propellant,
   wherein as each cylindrical section of electrically operated propellant is exposed by consumption of the one or more segments of SRM propellant, application of an electrical signal in an ignition condition ignites that cylindrical section to produce gas to add mass into the chamber without the use of physical control valves to augment the combustion of the SRM propellant and increase chamber pressure Pc, which remains below the self-sustaining threshold pressure.

20. The solid rocket motor of claim 19, wherein the motor comprises at least first and second segments of SRM propellant, wherein said electrical ignition comprises at least a first electrically operated propellant initiator operatively coupled to at least the second segment of SRM propellant, to initiate combustion in at least the second segment of SRM propellant, wherein the at least first and second segments of SRM propellant are operatively isolated from one another such that at least the first and second segments of SRM propellant can be individually initiated.

21. A method of managing thrust from a solid rocket motor (SRM), said SRM including a nozzle coupled to a combustion chamber, said nozzle having a throat with an effective throat area At, one or more segments of solid rocket motor (SRM) propellant within the combustion chamber and a thermal ignition coupled to at least one of the one or more segments of SRM propellant, each said segment of SRM propellant, once ignited, burns to completion to produce pressurized gas in the combustion chamber at a pressure Pc that flows through the throat of the nozzle to produce thrust, the method comprising:
   applying an electrical input to an ionic perchlorate-based electrically operated propellant positioned in or directly coupled to the combustion chamber, said electrically operated propellant having a self-sustaining threshold pressure at which the electrically operated propellant once ignited cannot be extinguished and below which the electrically operated propellant is extinguished by interruption of the electrical signal, wherein the chamber pressure Pc remains below the self-sustaining threshold pressure, wherein in an ignition condition the electrically operated propellant burns to produce gas to (a) add mass into the chamber upstream of the nozzle throat to increase the chamber pressure Pc, (b) reduce the effective throat area At to increase the chamber pressure Pc or (c) to inject mass downstream of the nozzle throat to provide thrust vector control or a combination thereof without the use of physical control valves;
   in an extinguishment condition, interrupting the electrical input to extinguish the electrically operated propellant; and
   in the ignition condition, reapplying the electrical input to reignite the electrically operated propellant.

22. The method of claim 21, wherein the electrically operated propellant comprises a plurality of cylindrical sections of electrically operated propellant positioned around and along the one or more segments of SRM propellant, wherein as the one or more segments of SRM propellant are consumed exposing in order the plurality of cylindrical section of electrically operated propellant, the method further comprising applying the electrical signal to the exposed cylindrical section of electrically operated propellant in the ignition condition to burn that cylindrical section of electrically operated propellant to add mass in the chamber upstream of the nozzle throat.

23. The method of claim 21, wherein the motor comprises at least first and second segments of SRM propellant, wherein the electrical ignition comprises at least a first electrically operated propellant initiator operatively coupled to at least the second segment of SRM propellant, to initiate combustion in at least the second segment of SRM propellant, wherein the at least first and second segments of SRM propellant are operatively isolated from one another such that at least the first and second segments of SRM propellant can be individually initiated.

* * * * *